(12) United States Patent
Liukkonen et al.

(10) Patent No.: US 7,007,004 B2
(45) Date of Patent: Feb. 28, 2006

(54) CONCURRENT OPERATION OF A STATE MACHINE FAMILY

(75) Inventors: Juha Liukkonen, Helsinki (FI); Jukka Syrjänen, Tampere (FI); Jarmo Ruusiala, Tampere (FI); Tomi Kartesalo, Tampere (FI); Erkki Ruohtula, Helsinki (FI); Markus Malmqvist, Helsinki (FI)

(73) Assignee: Nokia Corporation, Espoo (FI)

( * ) Notice: Subject to any disclaimer, the term of this patent is extended or adjusted under 35 U.S.C. 154(b) by 499 days.

(21) Appl. No.: 10/299,997

(22) Filed: Nov. 20, 2002

(65) Prior Publication Data

US 2004/0098364 A1     May 20, 2004

(51) Int. Cl.
    *G06F 17/30*         (2006.01)
(52) U.S. Cl. .............................. 707/1; 707/10; 718/100
(58) Field of Classification Search ............. 707/1–10, 707/100–104.1, 200–206; 710/54, 200; 718/1, 718/100, 102; 709/208–209
    See application file for complete search history.

(56) References Cited

U.S. PATENT DOCUMENTS

| | | | |
|---|---|---|---|
| 5,452,459 A * | 9/1995 | Drury et al. ................... | 707/3 |
| 5,774,738 A * | 6/1998 | Hillan ............................ | 712/1 |
| 6,052,455 A * | 4/2000 | James ................... | 379/201.03 |
| 6,167,423 A * | 12/2000 | Chopra et al. .............. | 718/100 |
| 6,260,186 B1 * | 7/2001 | James ......................... | 717/104 |
| 6,466,898 B1 * | 10/2002 | Chan ........................... | 703/17 |
| 6,477,558 B1 | 11/2002 | Irving et al. ................ | 718/100 |

OTHER PUBLICATIONS

Antonopoulos et al., Informing Algorithms for Efficient Scheduling of Synchronizing Threads on Multiprogrammed SMPs, Sep. 2001, IEEE—Proceedings International Conference on Parallel Processing, 123-130.*

* cited by examiner

*Primary Examiner*—Shahid Alam
*Assistant Examiner*—Jean Bolte Fleurantin
(74) *Attorney, Agent, or Firm*—Squire, Sanders & Dempsey LLP

(57) ABSTRACT

The present invention concerns a method and a system for operating state machines concurrently in a computing system. One or more state machine families are generated. Each family comprises one master state machine type for receiving service requests from outside its family and for forwarding the received service requests for servicing, and one or more slave state machine types for receiving and servicing the forwarded service requests. A thread pool is allocated to one or more state machine families. Each thread pool is specific to one state machine family and comprises one or more threads for executing the master instance and slave instances of the corresponding state machine family. State machine instances of one or more generated state machine families are assigned to corresponding threads of the allocated thread pools for execution.

26 Claims, 2 Drawing Sheets

CONCURRENT OPERATION OF A STATE MACHINE FAMILY

FIELD OF THE INVENTION

The present invention relates to telecommunications. In particular, the present invention relates to a novel and improved method and system for operating state machines concurrently in a computing system.

BACKGROUND OF THE INVENTION

Software applications often use state machines that interact by passing messages. A state machine is a software component that maintains data defining its state between inputs, e.g. messages from other state machines or from an operating system, and whose behavior at any given time in response to incoming input depends on its state. In telecommunications the inputs are typically received as asynchronous messages. The reason for the popularity of state machines lies in the fact that state automata have proven to be a powerful software engineering approach in implementation of signaling applications in telecommunications. Due to the message oriented nature of asynchronous signaling applications, it has been natural to implement these as state machines.

A state of a state machine accepts some set of messages. Each accepted message triggers a certain state transition. If a message not belonging to the set of accepted messages is received, it may be lost, although e.g. in telecommunications state machine applications it is typically possible to save messages in order to avoid losing them.

Each state maps to a certain set of state transitions. The state transitions contain the actual program statements to be executed. When a state transition is activated by a correct combination of the current state and received message, the statements contained in the transition will be executed. A transition function maps state-message pairs into state transitions. More than one pair may map into a same state transition which means that the same state transition may be active in multiple states.

A state machine type defines the transition function and contents of the state transitions of a state machine. A state machine type may be instantiated as a single state machine instance or as multiple state machine instances.

A single state machine is useful only in small applications. For implementing more complex applications, like e.g. telecommunications applications, it is useful to have a plurality of state machines working in concert. E.g. in a signaling application there may be allocated one state machine instance for every session, and there may be tens of thousands of sessions to be handled by the signaling application.

Thus to handle this processing demand state machine instances are typically executed in a multiprocessing environment by threads. The term thread is a well-known prior art-concept referring to an execution context that is independently scheduled, but shares a single address space with other threads.

However, having one operating system thread for each state machine instance is not technically feasible, because there may be many thousands of state machine instances and operating systems do not support such amounts of threads. For example, Linux sets a limit of 1024 threads per process. Also, context switches may be needed. The term context switch refers to an operation that an operating system uses to switch execution turns between processes and/or threads. Context switches are heavy and time consuming operations since the state of a process and/or thread having been executed needs to be saved in total, and correspondingly the state of a new process and/or thread to be executed needs to be restored before execution turns can be switched. These operations require a large amount of machine instructions which in turn consume clock cycles.

In prior art, these performance and system resource usage problems have been solved in various ways. For example, only a single thread may be used. However, this results in another problem in that, when a state machine instance run by the thread makes a blocking call, such as reads data from a disk file, all the state machine instances block.

Another solution is disclosed by U.S. Pat. No. 6,167,423 in which a mechanism called clique is provided. Multiple functionally similar state machines are grouped together and a thread is allocated for the whole group. Since the state machines to be grouped together are functionally similar, the state machines will communicate with each other frequently. Thus it is justified to allocate a common thread for the whole group as it will result in avoiding context switches.

However, as is obvious from the above, there are significant drawbacks to this mechanism. If a member of the group blocks, other members will also block. Further, to be useful the mechanism requires state machines functionally similar so that they may be grouped. This is rarely the case in actual implementations.

Thus there is an obvious need for an efficient solution providing concurrent operation of state machines in a computing system.

SUMMARY OF THE INVENTION

The present invention concerns a method and a system for operating state machines concurrently in a computing system. One or more state machine families are generated. Each family comprises one master state machine type for receiving service requests from outside its family and for forwarding the received service requests for servicing, and one or more slave state machine types for receiving and servicing the forwarded service requests. The slave state machine types may then communicate directly with the service requester. The master state machines types is instaniated as one master instance and at least one slave state machine type is instantiated as one or more hand instances. Each master and hand instance has a message queue of its own. One or more messages in the message queue of an instance may be processed consecutively one message at a time. Some of the hand instances may mainly assist other hand instances. A process may contain multiple state machine families, said families typically being different although a process may also contain multiple similar state machine families. It should be noted that "hand slave machine" may be used instead of "slave state machine" in the present application.

A thread pool is allocated to one or more generated state machine families. Each thread pool is specific to the state machine family to which it is allocated and comprises one or more threads for executing the master instance and hand instances of the corresponding state machine family.

As a result the total amount of threads for executing instances in a given thread pool typically is lower than the amount of instances in the corresponding state machine family.

State machine instances of one or more generated state machine families are assigned to corresponding threads of the allocated thread pools for execution. A given instance is executed by no more than one thread at any given time and a given thread executes no more than one instance at any given time. In the context of the present invention the term thread pool refers to a set of threads each of which threads is not exclusively assigned to execute any one state machine instance, but rather which threads are each scheduled to execute state machine instances of a corresponding state machine family as needed.

In an embodiment of the invention the amount of slave state machine types in a given state machine family is modified, i.e. increased or decreased at run-time.

In an embodiment of the invention the amount of hand instances of one or more slave state machine types in a given state machine family is modified, i.e. increased or decreased at run-time.

In an embodiment of the invention the amount of hand instances of one or more hand state machine types in a given state machine family is modified, i.e. increased or decreased at run-time.

In an embodiment of the invention maximum sizes for the message queues are defined. The maximum sizes may be defined per instance or per type. The maximum sizes may further be defined while generating the families or while instantiating the types.

In an embodiment of the invention an executed thread is released after completing a dialogue. Dialogue refers to communication or message exchange between processes, state machine families and/or state machine instances.

In an embodiment of the invention an executed thread is released after performing a blocking transaction, e.g. after starting a database operation.

In an embodiment of the invention the computing system is an SMP (Symmetric Multiprocessing) system. The term SMP refers to the processing of programs by multiple processors that share a common operating system and memory. In symmetric multiprocessing, the processors share memory and the I/O bus or data path. A single copy of the operating system is in charge of all the processors. In an SMP system threads may be executed concurrently one thread per processor.

In an embodiment of the invention the operating system is a multiprocessing operating system, e.g. Linux or UNIX.

In an embodiment of the invention the computing system is a telecommunications network element.

The invention provides solutions for several problems regarding performance, system resource usage and system administration related to state machines. The invention provides true concurrency for state machine families with thread pools. Also, when using thread pools in connection with state machine families according to the invention, if a state machine instance executed by a thread makes a blocking call it does not block the whole state machine family.

In comparison to the clique mechanism of U.S. Pat. No. 6,167,423 the present invention does not group similar state machines. Thus the present invention does not require functional similarity from the state machines. A common thread is allocated to a group of state machines in U.S. Pat. No. 6,167,423 whereas in the present invention a thread pool of multiple threads is allocated to a state machine family. A group of state machines in U.S. Pat. No. 6,167,423 shares a common message queue whereas in the present invention each state machine instance has its own message queue.

The state machine instances of the present invention are reusable, since when a given state machine instance finishes its task and "dies off", the resource allocated to it will be reused when another instance of the same type is created to execute another task. In the present invention at a given time each state machine type may be instantiated as any number of instances, each instance executing its own task.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
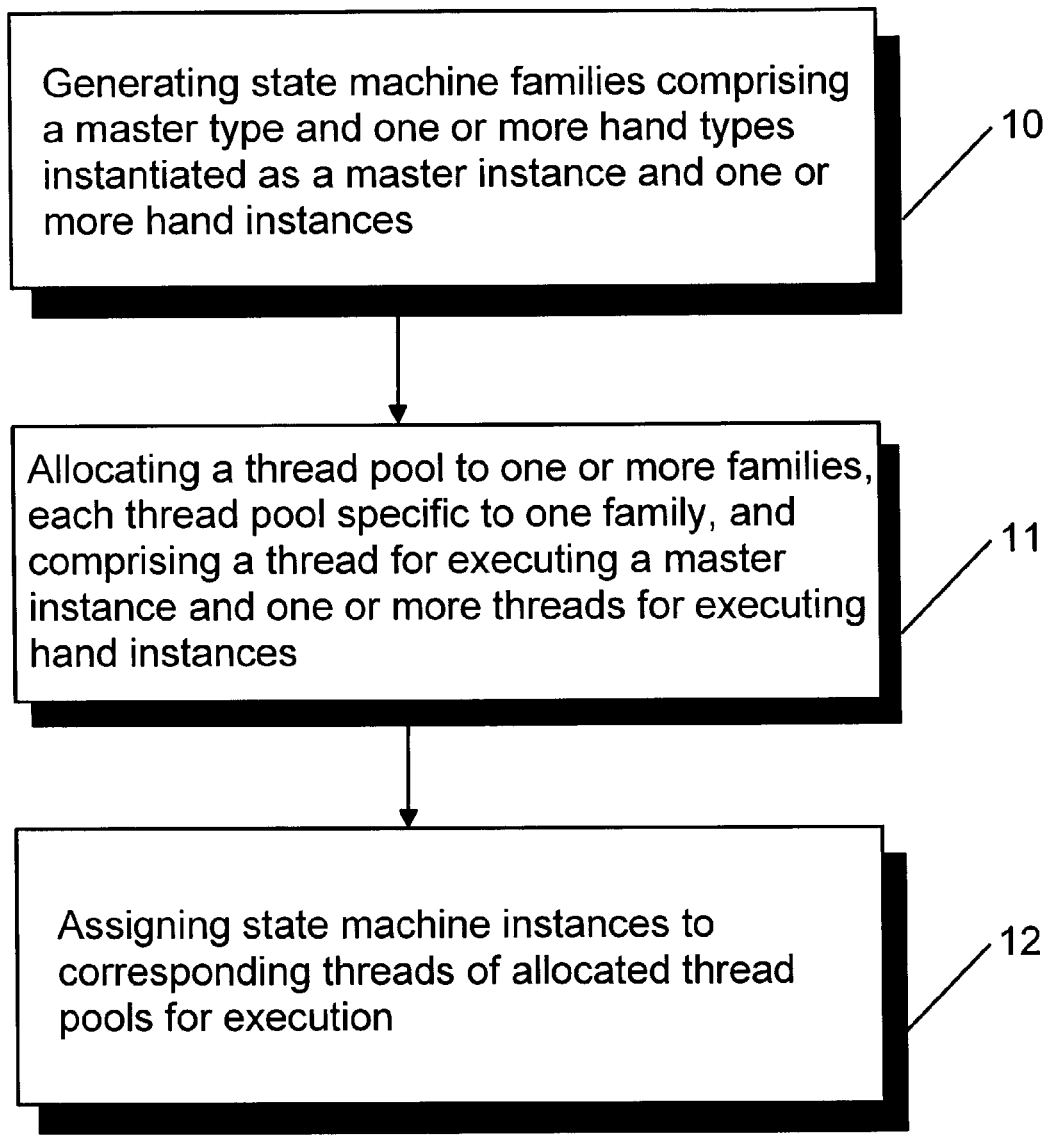
FIG. 1 is a diagram illustrating a method for operating state machines concurrently according to one embodiment of the present invention.

FIG. 1 illustrates a method for operating state machines concurrently in a computing system. One or more state machine families are generated, phase 10. Each family comprises one master state machine type for receiving service requests from outside its family and for forwarding the received service requests for servicing, and one or more slave state machine types for receiving and servicing the forwarded service requests. The slave state machine types may then communicate directly with the service requester. The master state machine type is instantiated as one master instance and at least one slave state machine type is instantiated as one or more hand instances. Each master and hand instance has a message queue of its own.

A thread pool is allocated to one or more generated state machine families, phase 11. Each thread pool is specific to the state machine family to which it is allocated and comprises one or more threads for executing the master instance and hand instances of the corresponding state machine family. Thus, in a preferred embodiment of the present invention threads of a given thread pool are not dedicated to particular master or hand instances.

In another preferred embodiment of the present invention each thread pool is specific to the state machine family to which it is allocated and comprises a thread for executing the master instance of the corresponding state machine family and one or more threads for executing hand instances of the corresponding state machine family. Thus, threads of a given thread pool are dedicated to particular master and hand instances.

State machine instances of one or more generated state machine families are assigned to corresponding threads of the allocated thread pools for execution, phase 12. A given instance is executed by no more than one thread at any given time and a given thread executes no more than one instance at any given time. As a result the total amount of threads for executing instances in a given thread pool typically is lower than the amount of instances in the corresponding state machine family. In the context of the present invention the term thread pool refers to a set of threads each of which threads is not exclusively assigned to execute any one state machine instance, but rather which threads are each scheduled to execute state machine instances of a corresponding state machine family as needed.

The startup of a family may comprise the following steps. A family is registered with a unique family ID. Next the family is initialized with the number of hand types and the thread pool size, i.e. the number of threads. Next the family master type is initialized. Next the hand types of the family are initialized. One or more hand pools each comprising hand objects of a given hand type are created. Finally the family master instance is started. The master instance activates hand instances from the hand pools as the master instance receives new service requests. A state machine instance is an activated state machine object. The amount of hand objects is modifiable at run-time.

After a single hand instance has finished its task, the hand instance is deactivated and the resources reserved by the hand instance are released. Between its activation and deactivation a hand instance may have been run in multiple various threads without releasing the lifetime specific resources of said hand instance. When a family has been started, it runs until the last of its members stops. When the master instance has stopped, the family starts preparing for shutdown by waiting until all the members have stopped. The resources of the family are released, e.g. the master and the hand instances are deleted and the thread pool of the family id deleted. After the family has been shutdown, the family may be unregistered.

Figure 2:
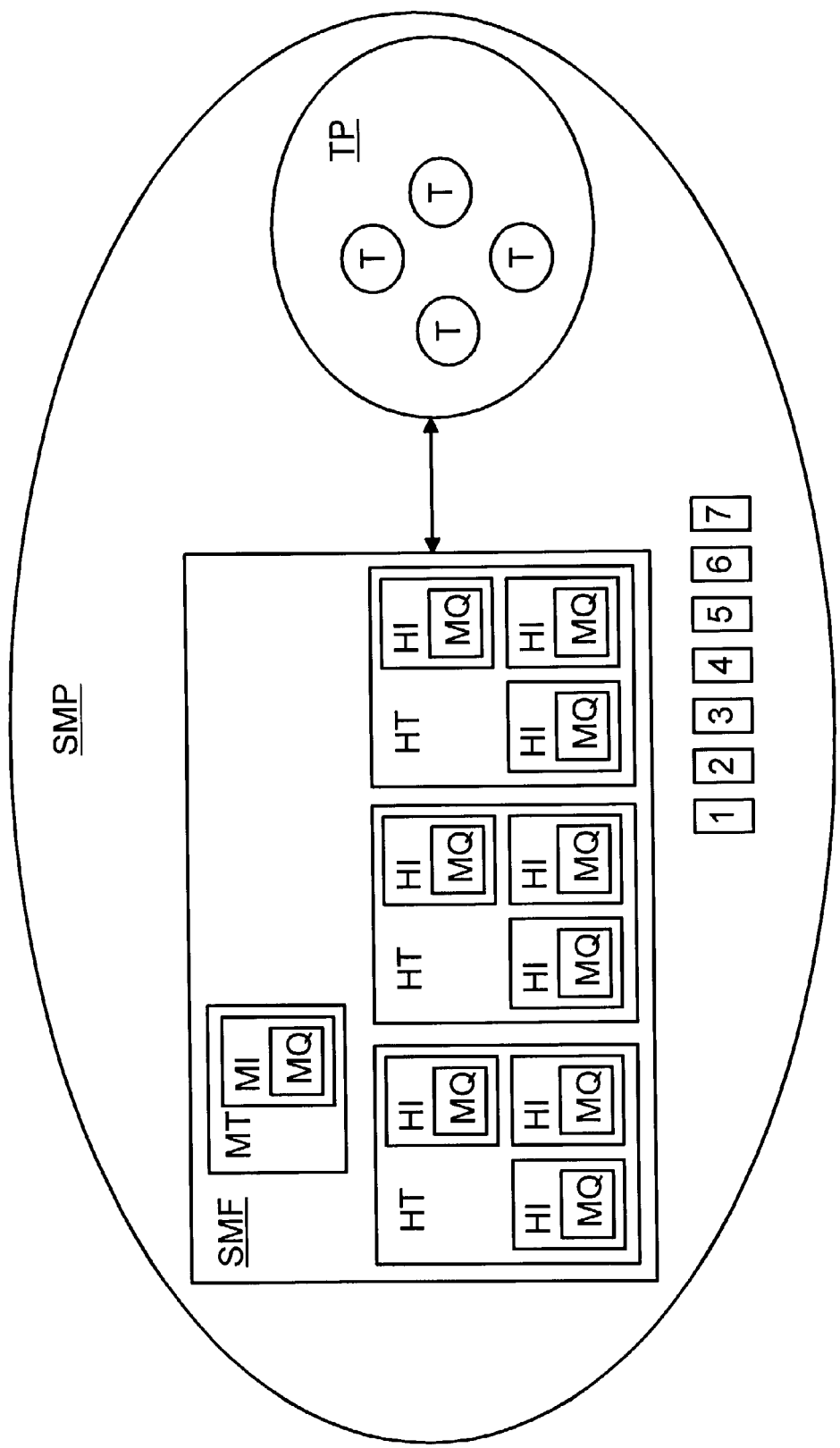
FIG. 2 is a block diagram illustrating a system for operating state machines concurrently according to one embodiment of the present invention.

FIG. 2 illustrates a system for operating state machines concurrently in a computing system SMP. In the embodiment of the invention disclosed in FIG. 2 the computing system is a telecommunications network element utilizing symmetric multiprocessing with e.g. Linux as the operating system.

In the embodiment of the invention disclosed in FIG. 2 the system comprises a state machine family SMF. The family comprises one master state machine type MT for receiving service requests from outside its family and for forwarding the received service requests for servicing. The family further comprises three hand state machine types HT for receiving and servicing the forwarded service requests. The master state machine type is instantiated as one master instance MI and hand state machine types are instantiated as hand instances HI. The amount of hand instances per hand type may vary. Each instance has a message queue MQ of its own. One or more messages in the message queue of an instance may be processed consecutively one message at a time.

It should be noted that the master state machine type MT and the hand state machine types HT disclosed in FIG. 2 are conceptual entities rather than actual software/hardware elements. It should be noted that a system according to the present invention may comprise several state machine families although only one family is illustrated in the embodiment of the invention disclosed in FIG. 2 for the sake of clarity.

In the embodiment of the invention disclosed in FIG. 2 the system further comprises a state machine family-specific thread pool TP. The thread pool comprises multiple threads T for executing the master instance and hand instances of the corresponding state machine family. A given instance is executed by no more than one thread at any given time and a given thread executes no more than one instance at any given time. Again it should be noted that a system according to the present invention comprising several state machine families preferably further comprises several thread pools although only one family and one thread pool is illustrated in the embodiment of the invention disclosed in FIG. 2 for the sake of clarity.

In the embodiment of the invention disclosed in FIG. 2 the system further comprises means 1 for modifying the amount of hand state machine types in a given state machine family at run-time. Thus by using means 1 the amount of hand state machine types in a given state machine family may be increased or decreased at run-time. The system further comprises means 2 for modifying the amount of threads in a given thread pool at run-time. Thus by using means 2 the amount of threads in a given thread pool may be increased or decreased at run-time. The system further comprises means 3 for modifying the amount of hand instances of one or more hand state machine types in a given state machine family at run-time. Thus by using means 3 the amount of hand instances of one or more hand state machine types in a given state machine family may be increased or decreased at run-time. The system further comprises means 4 for defining maximum sizes for the message queues. The maximum sizes may be defined per instance or per type. The maximum sizes may further be defined while generating the families or while instantiating the state machine types. The system further comprises means 5 for releasing an executed thread after said thread completing a dialogue. The system further comprises means 6 for releasing an executed thread after said thread performing a blocking transaction, e.g. after starting a database operation. The system further comprises means 7 for executing threads concurrently one thread per processor.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A method for operating state machines concurrently in a computing system, wherein the method comprises the steps of:

generating one or more state machine families, each family comprising one master state machine type for receiving service requests from outside its family and for forwarding the received service requests for servicing, and one or more slave state machine types for receiving and servicing the forwarded service requests, the master state machine type instantiated as one master instance and at least one slave state machine type instantiated as one or more slave instances, each instance having a message queue of its own, allocating to one or more generated state machine families a thread pool, each thread pool being specific to one state machine family and comprising one or more threads for executing the master instance and slave instances of the corresponding state machine family, and assigning state machine instances of one or more generated state machine families to corresponding threads of the allocated thread pools for execution, a given instance being executed by no more than one thread at any given time and a given thread executing no more than one instance at any given time.

2. The method according to claim 1, wherein the amount of slave state machine types in a given state machine family is modified at run-time.

3. The method according to claim 1, wherein the amount of threads in a given thread pool is modified at run-time.

4. The method according to claim 1, wherein the amount of slave instances of one or more slave state machine types in a given state machine family is modified at run-time.

5. The method according to claim 1, wherein maximum sizes for the message queues are defined.

6. The method according to claim 1, wherein an executed thread is released after completing a dialogue.

7. The method according to claim 1, wherein an executed thread is released after performing a blocking transaction.

8. The method according to claim 1, wherein the computing system is an Symmetric Multiprocessing system.

9. The method according to claim 8, wherein threads are executed concurrently one thread per processor.

10. The method according to claim 1, wherein the operating system is a multiprocessing operating system.

11. The method according to claim 10, wherein the operating system is Linux.

12. The method according to claim 10, wherein the operating system is UNIX.

13. The method according to claim 1, wherein the computing system is a telecommunications network element.

14. A system for operating state machines concurrently in a computing system, comprising:
   one or more state machine families, each family comprising one master state machine type for receiving service requests from outside its family and for forwarding the received service requests for servicing, and one or more slave state machine types for receiving and servicing the forwarded service requests, the master state machine type instantiated as one master instance and at least one slave state machine type instantiated as one or more slave instances, each instance having a message queue of its own, and
   one or more thread pools allocated to one or more state machine families, each thread pool being specific to one state machine family and comprising one or more threads for executing the master instance and slave instances of the corresponding state machine family,
   a given instance being executed by no more than one thread at any given time and a given thread executing no more than one instance at any given time.

15. The system according to claim 14, wherein the system comprises means for modifying the amount of slave state machine types in a given state machine family at run-time.

16. The system according to claim 14, wherein the system comprises means for modifying the amount of threads in a given thread pool at run-time.

17. The system according to claim 14, wherein the system comprises means for modifying the amount of slave instances of one or more slave state machine types in a given state machine family at run-time.

18. The system according to claim 14, wherein the system comprises means for defining maximum sizes for the message queues.

19. The system according to claim 14, wherein the system comprises means for releasing an executed thread after said thread completing a dialogue.

20. The system according to claim 14, wherein the system comprises means for releasing an executed thread after said thread performing a blocking transaction.

21. The system according to claim 14, wherein the computing system is an Symmetric Multiprocessing system.

22. The system according to claim 21, wherein the system comprises means for executing threads concurrently one thread per processor.

23. The system according to claim 14, wherein the operating system is a multiprocessing operating system.

24. The system according to claim 23, wherein the operating system is Linux.

25. The system according to claim 23, wherein the operating system is UNIX.

26. The system according to claim 14, wherein the computing system is a telecommunications network element.

* * * * *